UNITED STATES PATENT OFFICE.

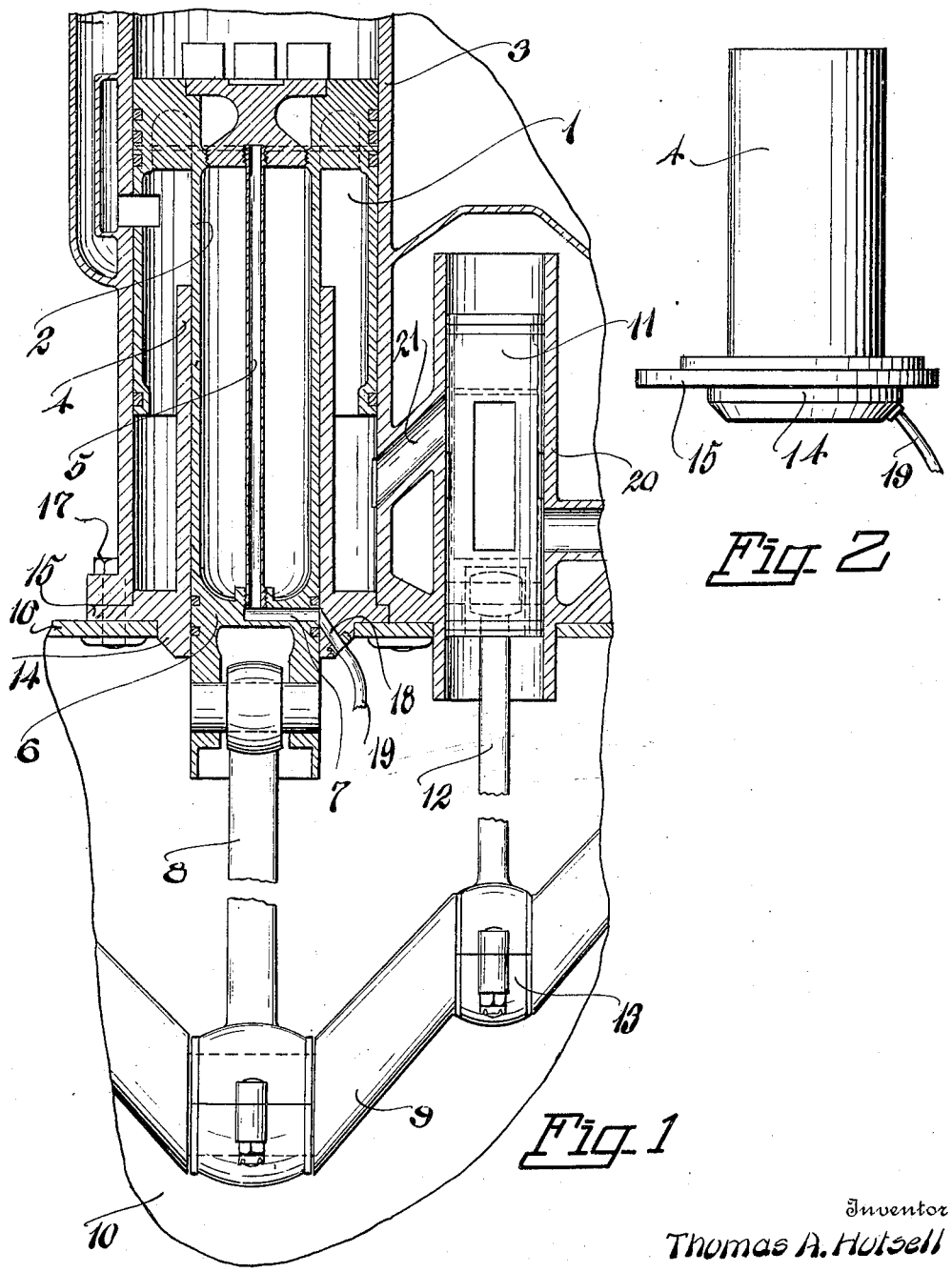

THOMAS A. HUTSELL, OF SPOKANE, WASHINGTON, ASSIGNOR TO THE HUTSELL MOTOR COMPANY, OF SPOKANE, WASHINGTON.

ENGINE CONSTRUCTION.

1,375,049.

Specification of Letters Patent.   Patented Apr. 19, 1921.

Application filed September 24, 1919.   Serial No. 326,057.

*To all whom it may concern:*

Be it known that I, THOMAS A. HUTSELL, a citizen of the United States, residing at Spokane, in the county of Spokane and State of Washington, have invented certain new and useful Improvements in Engine Construction, of which the following is a specification.

The present invention relates to improvements in engine construction particularly as applied to internal combustion engines. The primary object of the present application is to cover the special construction of the engine cylinder together with the housing for a special valve mechanism for controlling the admission of fuel gas to the cylinder of the engine, and the invention consists essentially in certain novel combinations and arrangements of parts of the engine as will be hereinafter more particularly specified and claimed.

In the accompanying drawings I have illustrated a portion of the engine sufficient to clearly exemplify the subject matter of the present application, showing its relation to other parts of the engine, and the single cylinder and piston construction shown in the drawings, it will be understood, form a unit of the motor as applied to an automobile, or as applied for other purposes.

Figure 1 is a vertical central sectional view of one of the cylinders of an automobile motor constructed according to the present invention, showing the novel combinations and arrangements of parts of the engine.

Fig. 2 is a view in side elevation of a guide sleeve which forms part of the cylinder and a rigid part of the engine, as will be described.

The type of engine embodied in the invention is that form employing a hollow piston head as 1 from which projects the hollow, concentric, piston stem 2, these two members, as a unit, reciprocating within the cylinder 3 and the tubular, concentric guide sleeve 4 which has an open end and projects up within the cylinder so that the piston stem may telescope as it reciprocates therein. Within the stem is secured an oil pipe 5 that is threaded into the partition 6 in the lower end of the stem, and a radial passage 7 to the exterior of this stem and bored in the partition provides communication from the exterior of the stem with the interior of the oil pipe, and from the upper end of this pipe, as described in a copending application for Patent No. 326058, the oil is distributed to the cylinder.

The stem is directly connected with the connecting rod 8 journaled on the crank shaft 9 in the casing 10, and this crank shaft also operates a piston valve 11 for admission of the fuel gas to the cylinder, through the connection 12 and eccentric 13 on the crank shaft.

A special construction of the cylinder involves the embodiment therewith of the guide sleeve 4 within which the stem 2 telescopes, and this sleeve, which is open at top and bottom, as in Fig. 1, is fashioned with a large, annular collar 14 at its lower end and projecting from its exterior, to form the lower closed end of the cylinder 3 of the engine. By means of integral, exterior flange 15, which is an annulus, and projects from the thick collar 14, the lower flanged end of the cylinder and the top 16 of the crank case are secured together bolts 17 being utilized to hold the parts as shown. Thus the guide sleeve, in addition to performing its function in guiding and holding stable the piston through its stem, also closes the lower end of the cylinder and forms the connecting part between the cylinder and the engine base or crank case.

At 18 in the collar 14 an inclined and radial duct is provided which extends from the interior of the sleeve to the exterior of the collar, and at its exterior opening a short lateral pipe 19 is attached to supply oil to the duct, the oil being received from a main oil pipe not shown. Adjacent to the cylinder of engine is provided an integral cylindrical casing 20 in which the piston valve 11 reciprocates, and this casing communicates with the interior of the cylinder by way of the fuel passage 21 to supply gas to the cylinder, the casing being open at top and bottom as shown and provided with an inlet port from the carbureter of the motor as usual. These parts of the engine are designed particularly for the use with and coaction of the piston and piston valve, both of which elements of the engine are covered in separate applications for patent Nos. 293,942 and 326,059, and the structure herein illustrated and claimed provides for facile assembling or dismounting, renders access to the cylinder, casing, stem, &c., easy, and the sleeve, which may be removed and replaced with facility provides for a stable movement of the piston in its cylinder.

What I claim is—

The combination with the crank case and its open top wall and a cylinder having an open lower end, of a concentric sleeve opening into the cylinder and crank case and having an exterior collar at its lower end to close the cylinder and top wall of the crank case, said collar provided with an oil supply passage and an oil pipe, a hollow piston in the cylinder inclosing the sleeve and having a hollow stem in the sleeve, a flange on the collar seated between the flanged end of the cylinder and the top wall of the case and securing means therefor, and said stem having means therein to receive oil from said supply passage.

In testimony whereof I affix my signature.

THOMAS A. HUTSELL.